United States Patent Office 3,121,125
Patented Feb. 11, 1964

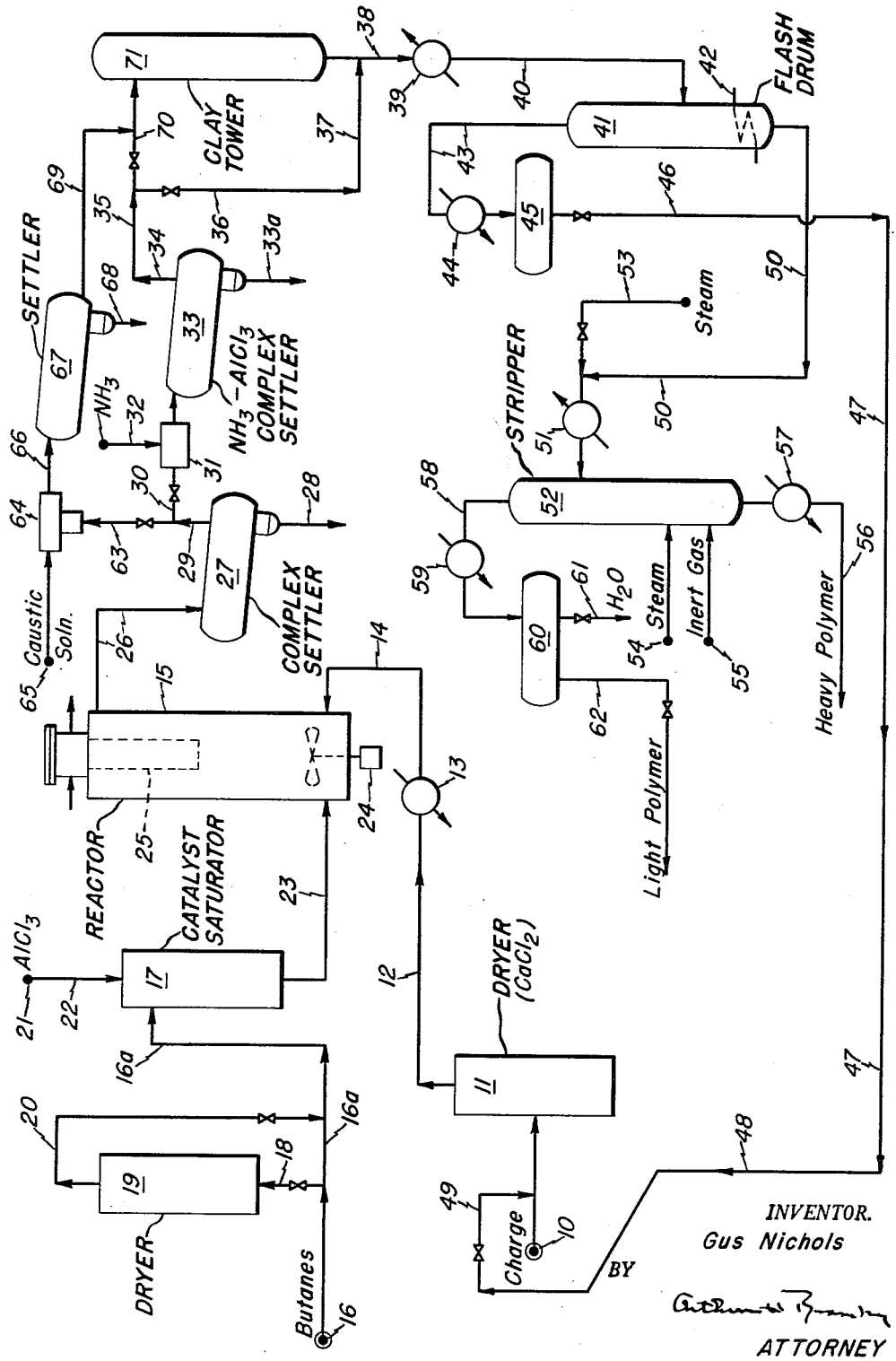

3,121,125
PROCESS FOR POLYMERIZING OLEFINS
Gus Nichols, Whiting, Ind., assignor to Standard Oil Company, Chicago, Ill., a corporation of Indiana
Filed Mar. 20, 1961, Ser. No. 96,784
Claims priority, application Japan Mar. 31, 1960
4 Claims. (Cl. 260—683.15)

This invention relates to an improved method and means for polymerizing olefins such as propylene and butylene with aluminum chloride-hydrocarbon complex catalyst, and it pertains more particularly to an improved process for obtaining large yields of polymers in the polymerization of isobutylene or mixed butylenes from a butane-butylene refinery stream or other suitable sources.

It has long been known that normally gaseous olefins can be converted to viscous liquid polymers by means of solid aluminum chloride as such or by means of liquid aluminum chloride double compounds or complexes. Effective use of an aluminum chloride-hydrocarbon complex catalyst has been obtained by passing dispersed liquefied olefins upwardly through a cooled column thereof. An object of this invention is to provide a further improvement in the use of aluminum chloride-hydrocarbon complex in hydrocarbon conversion processes and particularly in processes for polymerizing normally gaseous olefins such as propylene, isobutylene, normal butenes, and mixtures thereof. A particular object of the invention is to increase the quantity and quality of polymers obtainable in a given polymerization reactor by means of liquid aluminum chloride-hydrocarbon complex catalyst. Other objects will become apparent as the detailed description of the invention proceeds.

Briefly, the invention employs a continuous liquid phase polymerization system wherein aluminum chloride catalyst dissolved and/or dispersed in butanes is reacted with liquid butylenes at reduced temperatures to form butylenes polymers and aluminum chloride-hydrocarbon complex, the bulk of the latter separated from the polymers by settling, and the polymers freed of the remaining complex by treating with anhydrous ammonia; whereby a solid aluminum chloride-ammonia complex is formed and settled from the polymers. The clear polymers are then freed of unreacted hydrocarbons by flash distillation and the polymers fractionated to give polymer fractions of desired molecular weights.

As applied to the polymerization of normal and isobutylene in a petroleum refinery butane-butylenes stream, or from any other source, a particular embodiment of the invention contemplates passing dry butanes, suitably a depropanized butane stream at a temperature of about 175° F.–200° F., suitably about 180° F. and about 395 p.s.i.a. into the top of a saturator containing a bed of aluminum chloride catalyst, and passing the butane downward through the bed of aluminum chloride at a rate to form an aluminum chloride saturated solution of butanes containing from about 4 pounds to about 10 pounds of aluminum chloride per barrel of the hydrocarbon leaving the bottom of the saturator. The effluent from the saturator at a temperature of about 175° F. and a dried butane-butylene stream cooled by suitable heat exchange means to a temperature of from about 10° F. to about 30° F., suitably about 20° F., are separately introduced into the bottom of a polymerization reactor maintained at a temperature of from about 0° F. to about 80° F., preferably about 20° F. to about 40° F. by suitable refrigeration means, such as for example, propane or ammonia refrigeration, and at a sufficient pressure to insure liquid conditions, e.g. about 50–100 p.s.i.g. The aluminum chloride-saturated butanes and the butylenes feed are introduced into the reactor in the ratio of 0.5 to 1.5 pounds catalyst per 100 pounds of olefin in the charging stock. The reactor temperature should be carefully controlled since while increased reactor temperatures increases conversion of total butylenes, it decreases the amount of heavy polymer in the total polymer product.

The reactor effluent consisting of polymerized butylenes, aluminum chloride hydrocarbon complex and unreacted hydrocarbons are passed to a settling drum wherein the major amount of the complex is settled out and withdrawn. The effluent from the setting drum consists of a solution of polymers containing small amounts of the aluminum chloride complex and unreacted hydrocarbons is preferably treated by mixing anhydrous ammonia with said effluent at a temperature of about 32°–160 F. whereby the aluminum chloride is precipitated out as a solid aluminum chloride-ammonia complex which separates from the clear butylene polymer solution. After separation and removal of the aluminum chloride-ammonia complex the clear butylenes polymers solution is flash distilled in a flash drum to remove therefrom unreacted hydrocarbons and then passed to a stripper for fractionation into suitable polymer fractions. The unreacted hydrocarbons from the flash drum can be suitably recycled to the butylenes feed stream in amounts necessary to obtain a feed stream of desired composition.

The invention will be more clearly understood from the following detailed description of a specific example read in conjunction with the accompanying drawing which forms a part of this specification and which is a schematic flow diagram of the improved process of this invention.

While the invention is applicable to liquid phase polymerization of normally gaseous olefins, such as propylene, isobutylene, normal butylenes, and mixtures thereof, it is primarily directed to the polymerization of a butane-butylene mixture associated with butanes in so-called butane-butylene refinery stream. In this example, the charging stock is a petroleum refinery butane-butylene stream containing about 26 weight percent isobutylene, about 37 weight percent normal butylenes, and about 36 weight percent butanes, such stocks usually containing a small amount of propane, propylene, pentanes, and/or pentenes.

A butane-butylene charging stock from source 10 is preferably washed with about a 10% NaOH solution to remove mercaptan sulfur, if present, from the feed and then passed through a suitable dryer 11 charged with calcium chloride. The dried feed stock is then passed through line 12 and one or more heat exchangers or coolers 13 to cool the feed stream to a temperature of about 0° F. to 30° F., suitably about 20° F. The cooled feed stream is then passed via line 14 to the bottom of reactor 15 and charged thereinto.

A butanes stream from source 16, preferably depropanized, is passed via line 16a to the top of saturator 17. The butanes stream should be essentially free of any water, and if necessary is passed from line 16, via line 18, through calcium chloride dryer 19, and thence via line 20 to line 16 to saturator 17. Saturator 17 is charged with aluminum chloride from source 21 via line 22 and suitable hopper means (not shown). The dry butanes stream to the saturator is heated by suitable heat exchanger means to a temperature of about 175° –200° F., suitably 180° F. and at about 395 p.s.i.a. The saturator is operated at a temperature of about 200° F. and under sufficient pressure to maintain a liquid phase.

The aluminum chloride may be added to the saturator in the form of lump or powered anhydrous aluminum chloride and may be distributed throughout the saturator or maintained in beds or other suitable means. While one saturator is diagrammatically shown in the drawing, in practice, banks of at least two such saturators will be used so that while the aluminum chloride solution from one is being used, the other saturator or saturators can be in the process of preparing aluminum chloride solution in butanes.

The effluent from saturator 17, butanes having dissolved therein about 5 pounds aluminum chloride per barrel butanes, is passed via line 23 into the bottom of reactor 15 wherein it is mixed with the butylenes feed by means of suitable agitator means, such as stirrer 24. A temperature of about 20° F. is maintained in reactor 15 by suitable refrigeration means 25 such as by propane refrigeration.

Product effluent from the top of reactor 15, consisting of polymerized butylenes, aluminum chloride-hydrocarbon complex and unreacted hydrocarbons, such as butylenes and butanes, is passed via line 26 to settler 27 wherein the bulk of the entrained catalyst complex is settled out and withdrawn via line 28 for disposal. The effluent from settler 27, consisting of butylene polymers, a small amount of entrained polymer-aluminum chloride-complex and unreacted hydrocarbons, is passed via lines 29 and 30 to mixer 31 wherein it is mixed with anhydrous ammonia at about atmospheric temperature from source 32 and introduced into the settler 33, wherein the resultant solid aluminum chloride-ammonia complex settles out and is withdrawn via line 33a.

The product effluent from settler 33, consisting of clear butylenes polymers and unreacted hydrocarbons, is passed via lines 34, 35, 36, 37 and 38 through heater 39 and line 40 to flash drum 41 operating at a pressure of about 100 p.s.i.g. with a top temperature of about 300° F. and bottom temperature of about 320° F. being maintained by heater 42.

In the flash tower 41, unreacted hydrocarbons, chiefly butylenes and butanes, are taken overhead through line 43, condensed in cooler 44 and collected in receiver 45. The unreacted hydrocarbons in receiver 45 can, if desired, be passed via lines 46, 47, 48 and 49 and admixed with the butylenes feed to the reactor 15 to adjust the composition of the butanes-butylenes feed stream to give the most efficient operation and desired products yield.

Increasing the ratio of isobutylene to normal butylene in the feed stock or charge to the reactor increases the conversion on total butylenes and results in a more viscous heavy polymer. To obtain polymers of the desired viscosity and molecule weight, the ratio of isobutylene to normal butylene in the feed stock can be effectively controlled by recycle of controlled amounts of the unreacted hydrocarbons from the receiver 45 to the charge stock.

From the base of the flash tower 41, the polymer mixture passes via line 50 through heater 51 to stripping tower 52. Heater 51, suitably a conventional Dowthern boiler, raises the temperature of the polymer mixture to about 600° F.; it is usually desirable to add 110 pounds of steam from line 53 in amounts sufficient to facilitate the desired extent of stripping.

In the stripping tower 52, preferably operating at about atmospheric or reduced pressure, the stripping is effected by 110 pound steam introduced by line 54. An inert gas is usually introduced via line 55 at a point below the steam line 54 to insure removal of steam from the heavier or bottom polymer fraction which is withdrawn at a temperature of about 475° F. from the base of the stripper through line 56, after being cooled in cooler 57 to about 200° F. A lighter polymer fraction is taken overhead from stripper 52 via line 58 and passed through cooler 59 to receiver 60. Condensed water is withdrawn through line 61 and the lighter polymer fraction withdrawn from receiver 60 via line 62 at a temperature of about 110° F.

Depending upon the stripping temperatures employed in stripper 52, polymer fractions of varying molecular weights are obtainable which can be blended together in various proportions to obtain a series of polymers of different molecular weights, varying from about 300 to about 1000 or more.

If desired, the effluent from complex settler 27, instead of being treated with anhydrous ammonia as above described, can be clarified by passing the effluent from settler 27 via line 63 to mixer 64 wherein it is mixed with an aqueous caustic solution of about 0.4% strength from source 65 and the mixture passed via line 66 to caustic settler 67, from which the aqueous caustic wash is withdrawn via line 68. The caustic-washed effluent from settler 67 is passed via lines 69 and 70 to filter tower 71 which may be a bed of sand, gravel, limestone (chat) or preferably fuller's earth for removing entrained aluminum compounds. The clear effluent is then removed from tower 71 via line 38 and processed as hereinabove described.

If desired, the effluent from the $NH_3$—$AlCl_3$ complex settler 31, can be passed via lines 34, 35 and 70 through the filter tower 71, although this is seldom, if ever, required.

The addition of anhydrous ammonia to the effluent from the complex settler 27 avoids danger of haze formation due to colloidal alumina from the hydrolysis with caustic; makes possible the obtaining of polymers of improved color without the conventional drying and clay treatment; provides for complete removal of aluminum chloride, hence alleviating the danger of $AlCl_3$ passing through the conventional scrubbers to cause corrosion of the stripping equipment, and provides polymer of improved color stability.

While, as has been shown, it is preferable to charge to the reactor a solution of aluminum chloride catalyst in liquid butanes, it may be desirable under certain circumstances to employ the aluminum chloride in the form of a slurry with light polymer recycled from line 62 by suitable means. Aluminum chloride preferably in the form of powder of about 40 mesh or smaller is slurried with recycled and preferably dried light polymer, in the approximate ratio of about 0.3 pound $AlCl_3$ to each gallon of the recycled light polymer.

The aluminum chloride slurry is a relatively nonviscous suspension of powdered aluminum chloride and it is prepared at ordinary temperatures in the absence of added HCl so that in the short time before the slurry enters the reactor it does not complex with the light polymer in which it is slurried, but on the contrary combines with the already formed complex to fortify it.

While the invention has thus been described with respect to a specific polymerization operation of butylenes, it should be understood that this is given by way of illustration and that the invention is not limited thereto but is applicable to the polymerization of propylene. The composition of the butane-butylene stream may be varied throughout a relatively wide range, although it is preferred that the mixed butylenes constitute about 20% to 80% of the total charge and that both isobutylene and normal butylene be present to the extent of at least about 10%. It is important in all cases that the hydrocarbon be in the continuous phase in the stirred portion of the reactor and in some cases it may be advantageous to recycle an aliquot portion of the total hydrocarbon reactor effluent with incoming charging stock.

I claim:

1. In the process for polymerizing normally gaseous olefins selected from the class consisting of $C_3$ olefins, $C_4$ olefins and mixtures thereof wherein said olefins are contacted with aluminum chloride catalyst in a polymerization zone at a temperature of from about 0° F. to about 80° F., removing from said polymerization zone effluent containing polymerized olefins in admixture with aluminum chloride-hydrocarbon complex, separating in a first settling zone substantially all of the aluminum chloride-hydrocarbon complex, from said olefin polymer, the improvement comprising treating said olefin polymer containing a small amount of unseparated aluminum chloride-complex from said settling zone with anhydrous ammonia at a temperature of from about 32° F. to 160° F. to form a solid aluminum chloride-ammonia complex, separating in a second settling zone said solid aluminum chloride-ammonia complex from said olefin polymers, and fractionating the effluent from the second settling zone to remove overhead unreacted hydrocarbons from said olefin polymers.

2. The process of claim 1 in which the gaseous olefin is isobutylene.

3. The process of claim 1 in which the gaseous olefins are in a mixture of gaseous hydrocarbons containing butylene and butanes.

4. The process of claim 1 in which the gaseous olefin is propylene.

References Cited in the file of this patent
UNITED STATES PATENTS

| | | |
|---|---|---|
| 2,291,510 | Thomas et al. | July 28, 1942 |
| 2,677,002 | Yahnke et al. | Apr. 27, 1954 |